United States Patent
Dinan

(10) Patent No.: US 10,194,439 B2
(45) Date of Patent: Jan. 29, 2019

(54) SUBFRAME CONFIGURATION IN A WIRELESS DEVICE AND WIRELESS NETWORK

(71) Applicant: Ofinno Technologies, LLC, Herndon, VA (US)

(72) Inventor: Esmael Hejazi Dinan, Herndon, VA (US)

(73) Assignee: Ofinno Technologies, LLC, Herndon, VA (US)

(*) Notice: Subject to any disclaimer, the term of this patent is extended or adjusted under 35 U.S.C. 154(b) by 17 days.

(21) Appl. No.: 15/284,301

(22) Filed: Oct. 3, 2016

(65) Prior Publication Data

US 2017/0099667 A1 Apr. 6, 2017

Related U.S. Application Data

(60) Provisional application No. 62/235,813, filed on Oct. 1, 2015.

(51) Int. Cl.
| | |
|---|---|
| *H04W 72/04* | (2009.01) |
| *H04L 5/00* | (2006.01) |
| *H04W 72/12* | (2009.01) |
| *H04W 74/00* | (2009.01) |
| *H04W 74/04* | (2009.01) |
| *H04W 74/08* | (2009.01) |

(52) U.S. Cl.
CPC ....... *H04W 72/0453* (2013.01); *H04L 5/0053* (2013.01); *H04W 72/0446* (2013.01); *H04W 72/12* (2013.01); *H04W 74/006* (2013.01); *H04W 74/04* (2013.01); *H04L 5/001* (2013.01); *H04W 74/0808* (2013.01)

(58) Field of Classification Search
None
See application file for complete search history.

(56) References Cited

U.S. PATENT DOCUMENTS

| | | | | |
|---|---|---|---|---|
| 2016/0302180 | A1* | 10/2016 | Nory | ................... H04L 27/2613 |
| 2017/0156075 | A1* | 6/2017 | Harada | ................. H04W 16/14 |
| 2017/0280448 | A1* | 9/2017 | Takeda | .............. H04W 72/0446 |
| 2017/0303220 | A1* | 10/2017 | Sadeghi | .............. H04W 56/001 |
| 2017/0310434 | A1* | 10/2017 | Harada | ................... H04L 5/001 |
| 2018/0176956 | A1* | 6/2018 | Koutsinnanis | ........ H04W 72/12 |

OTHER PUBLICATIONS

3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13).

(Continued)

*Primary Examiner* — Jutai Kao
(74) *Attorney, Agent, or Firm* — David Grossman; Kavon Nasabzadeh; Esmael Dinan

(57) ABSTRACT

A base station transmits at least one message comprising one or more first parameters identifying one or more subframes as a listen-before-talk (LBT) subframe. The base station performs an LBT procedure in a subframe in the one or more subframe. A burst is transmitted when the LBT procedure indicates a clear channel. The burst is configurable to start in the subframe if the subframe is identified as an LBT subframe.

17 Claims, 15 Drawing Sheets

(56) References Cited

OTHER PUBLICATIONS

3GPP TS 36.213 V12.5.0 (Mar. 2015), Technical Specification, 3rd Generation Partnership Project; Technical Specification Group Radio Access Network; Evolved Universal Terrestrial Radio Access (E-UTRA);Physical layer procedures (Release 12).
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access control (MAC) protocol specification, Valbonne, France.
3GPP TS 36.423 V12.9.0 (Jun. 2016), Technical Specification, 3rd Generation Partnership Project; Technical Specification Group Radio Access Network; Evolved Universal Terrestrial Radio Access Network (E-UTRAN); X2 application protocol (X2AP), (Release 12).
R1-155630, 3GPP TSG RAN WG1 Meeting #82bis, Malmö, Sweden, Oct. 5-9, 2015, Source: Alcatel-Lucent Shanghai Bell, Alcatel-Lucent, Title:Support of Frequency Reuse in LAA.

\* cited by examiner

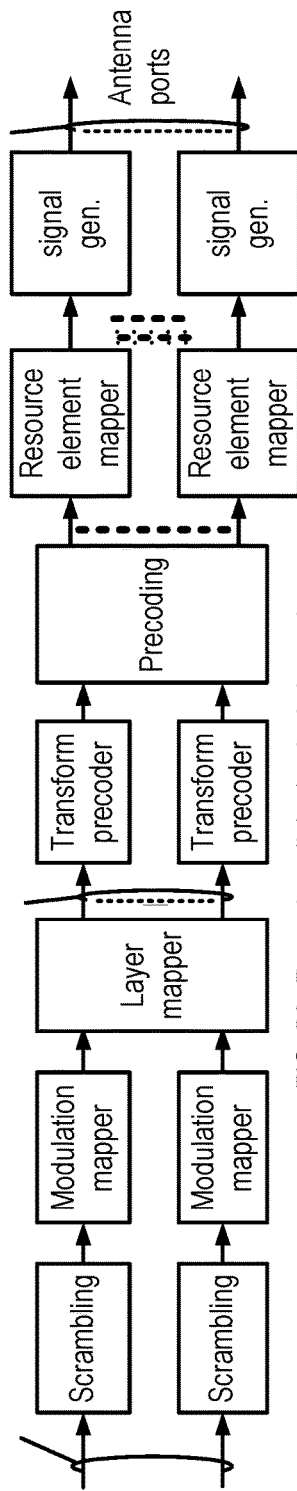
FIG. 5A Example uplink physical channel
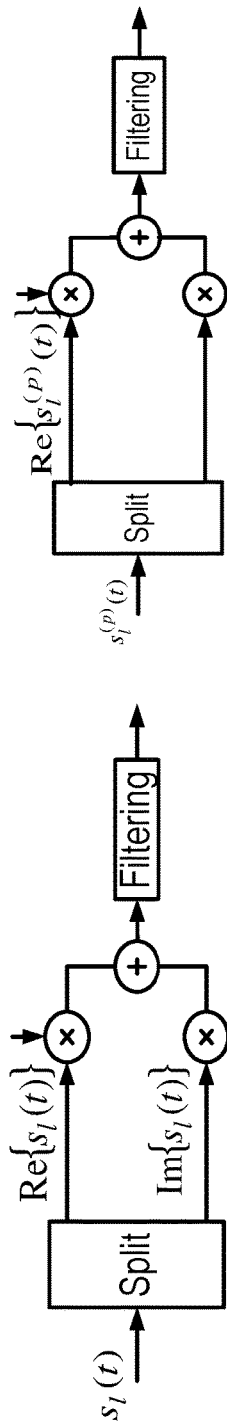
FIG. 5B Example uplink modulation
FIG. 5D Example downlink modulation
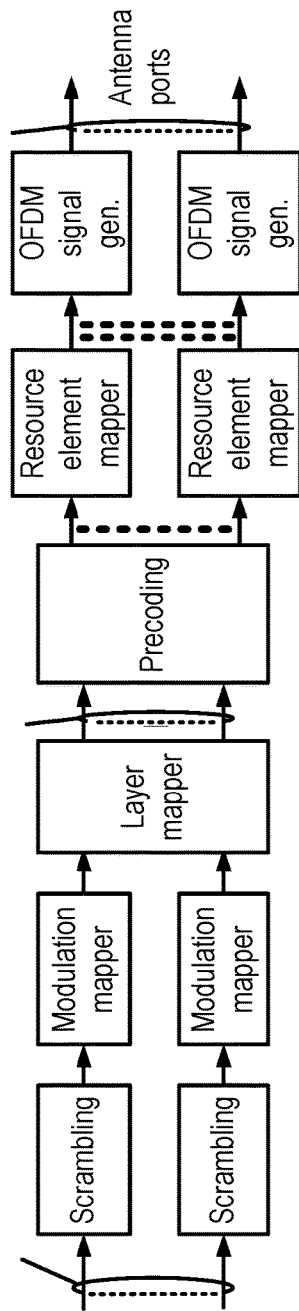
FIG. 5C Example downlink physical channel Dual-Connectivity- two MAC entities at UE side

|     | #0 | #1 | #2 | #3 | #4 | #5 | #6 | #7 | #8 | #9 |
|-----|----|----|----|----|----|----|----|----|----|----|
| BS1 | 0  | 1  | 1  | 1  | 0  | 0  | 0  | 0  | 0  | 1  |
| BS2 | 1  | 0  | 0  | 0  | 1  | 1  | 0  | 0  | 0  | 0  |
| BS3 | 0  | 0  | 0  | 0  | 0  | 0  | 1  | 1  | 1  | 0  |
| BS4 | 0  | 0  | 0  | 0  | 0  | 1  | 1  | 1  | 0  | 0  |

FIG. 12

SUBFRAME CONFIGURATION IN A WIRELESS DEVICE AND WIRELESS NETWORK

CROSS-REFERENCE TO RELATED APPLICATIONS

This application claims the benefit of U.S. Provisional Application No. 62/235,813, filed Oct. 1, 2015, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 12 is an example diagram depicting subframe configuration in a plurality of base stations as per an aspect of an embodiment of the present invention.

DETAILED DESCRIPTION OF EMBODIMENTS

Figure 1:
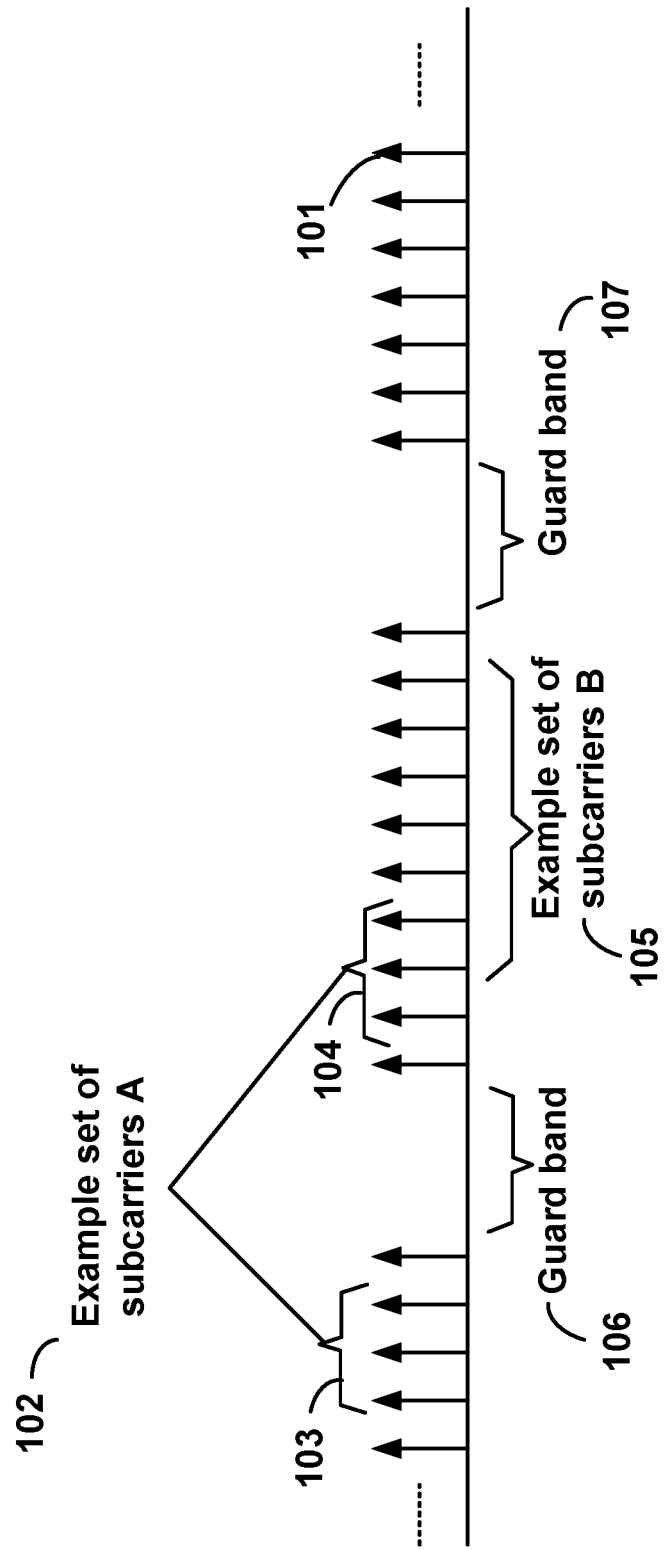
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in multicarrier communication systems.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
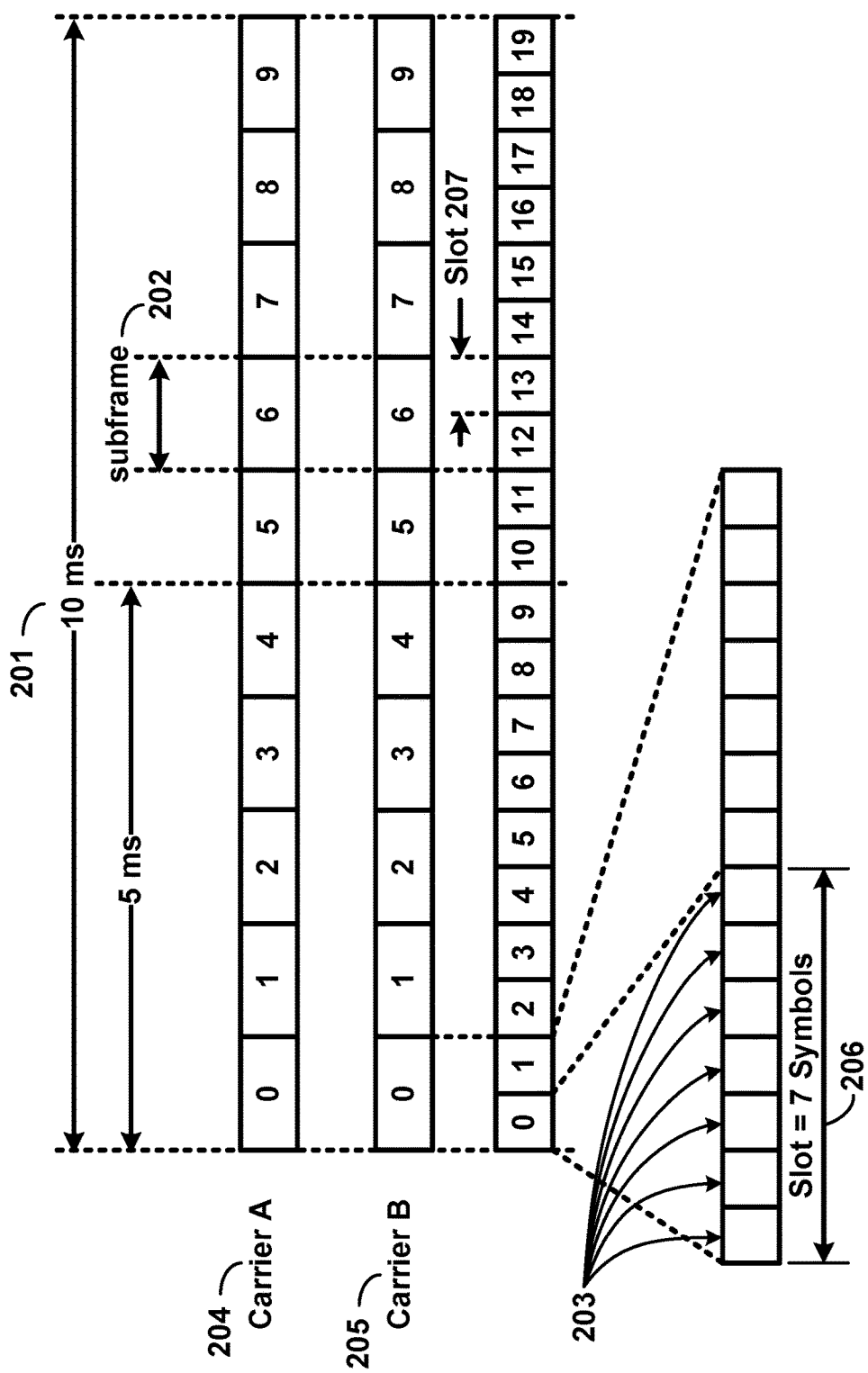
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
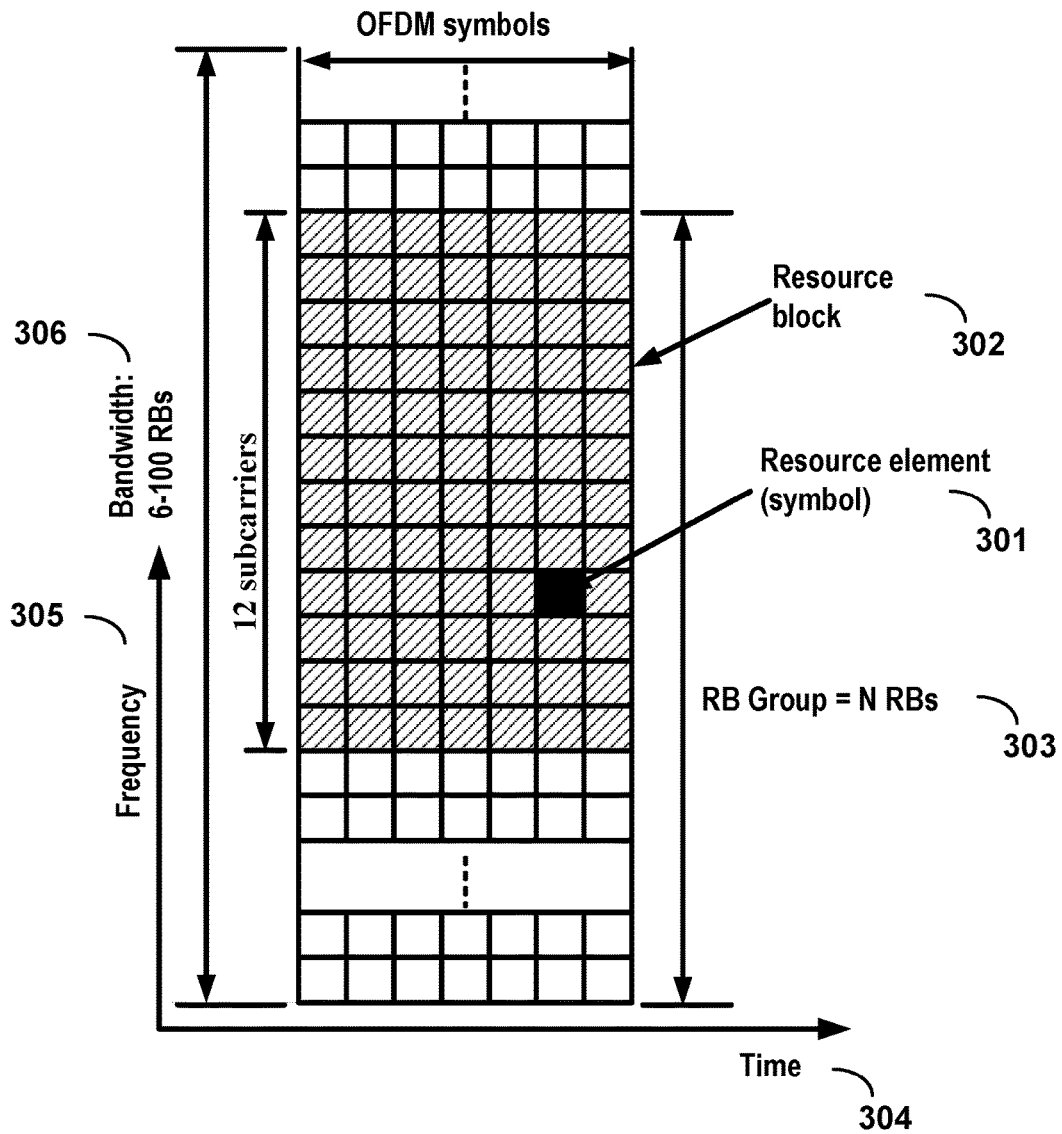
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-TDMA signal for each antenna port, and/or the like.

Example modulation and up-conversion to the carrier frequency of the complex-valued DFTS-OFDM/SC-TDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
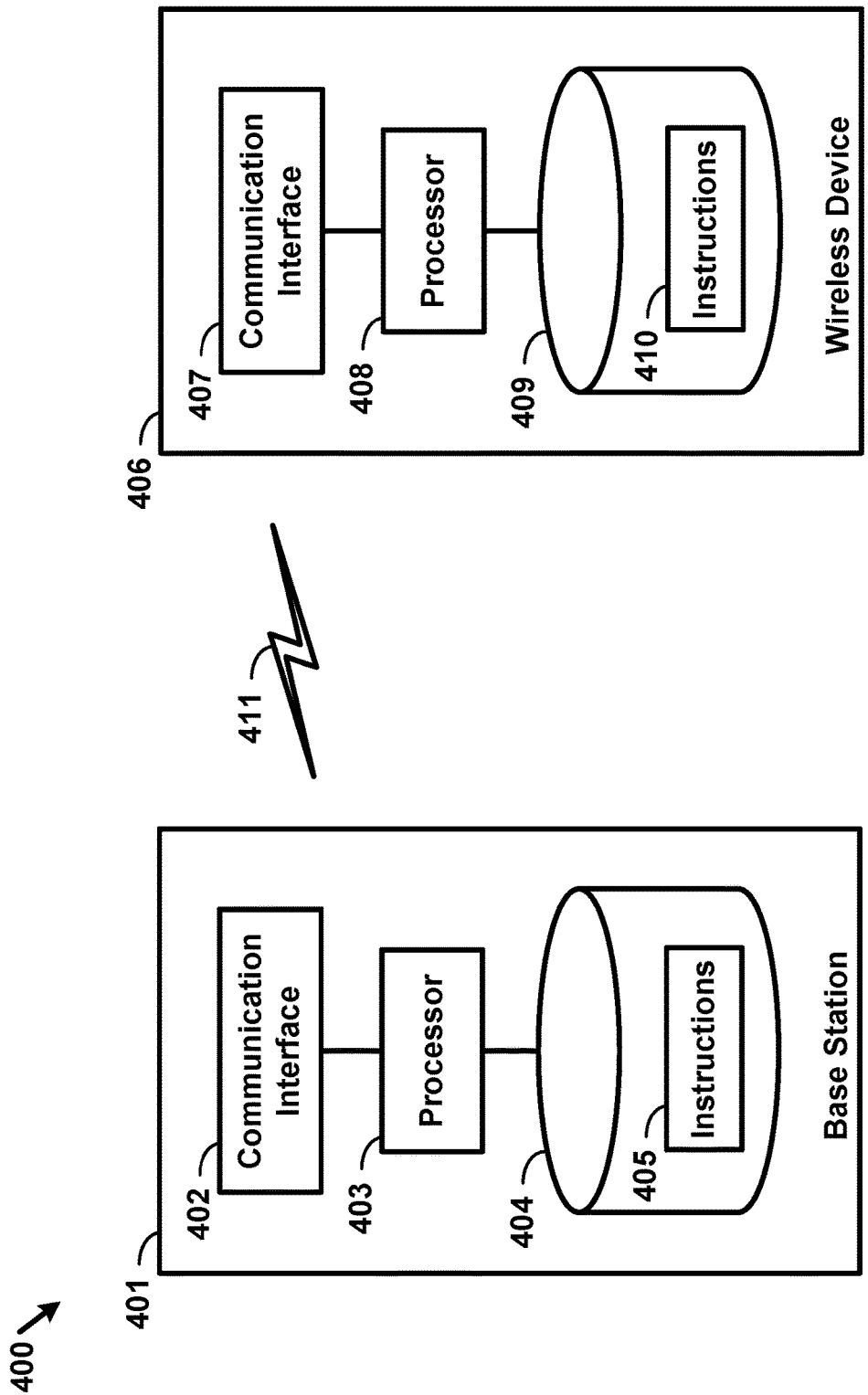
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
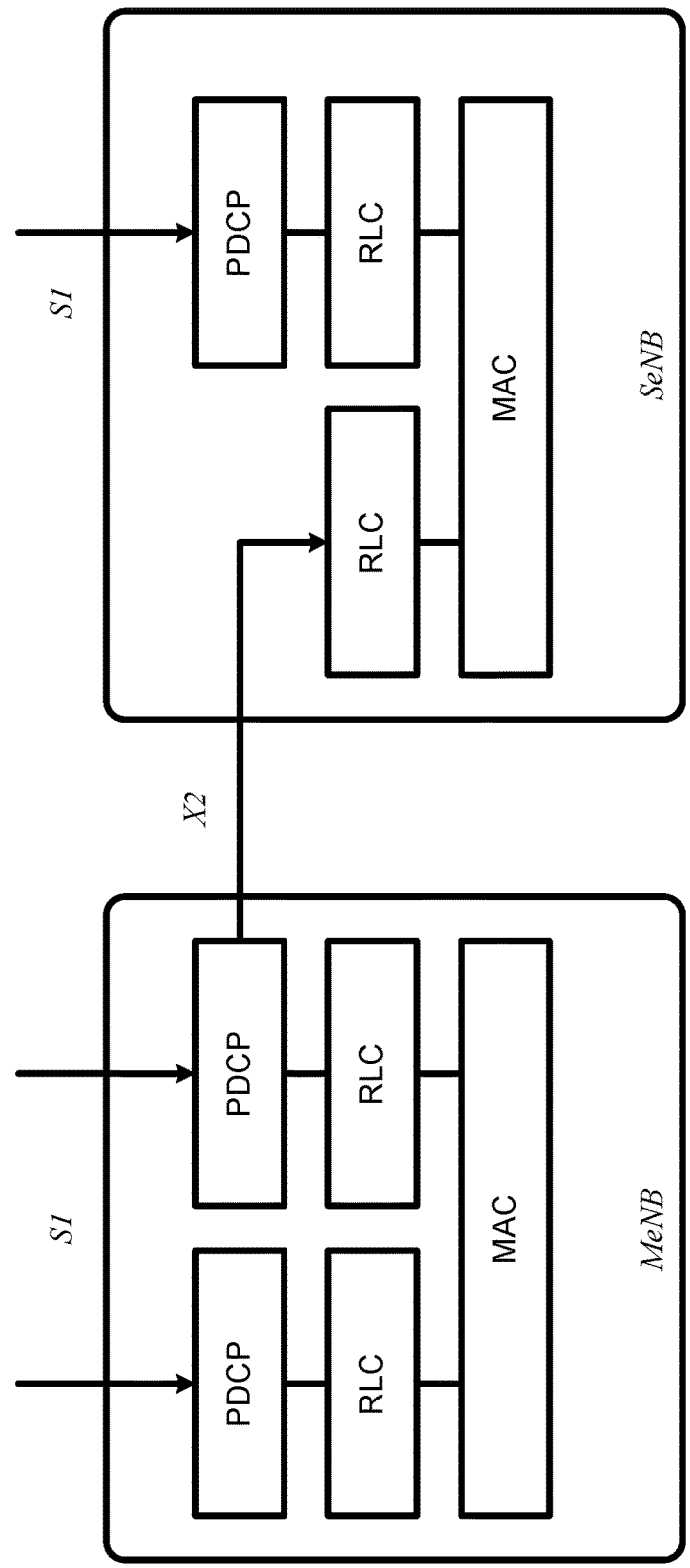
FIG. 6 is an example diagram for a protocol structure with CA and DC as per an aspect of an embodiment of the present invention.
Figure 7:
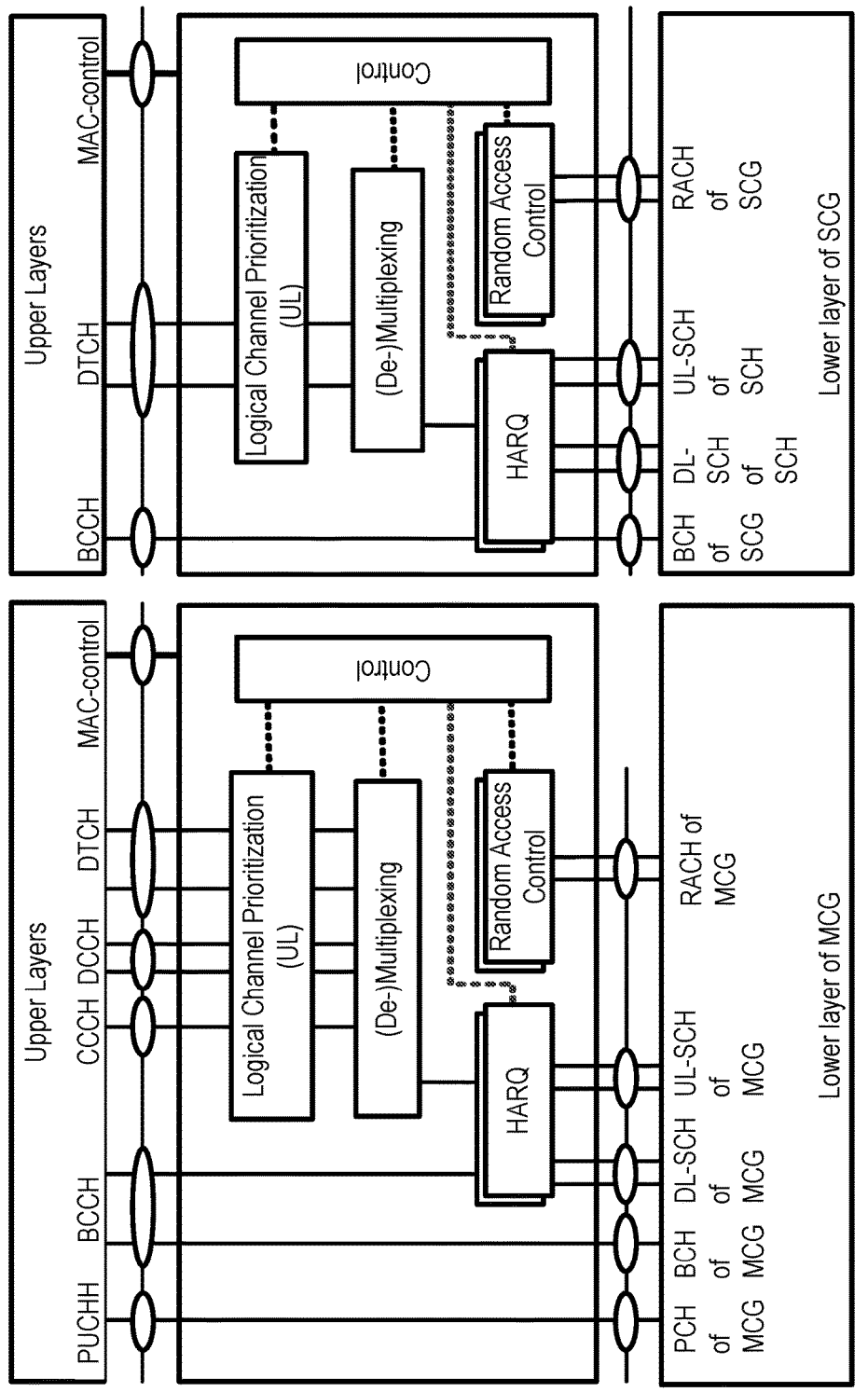
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
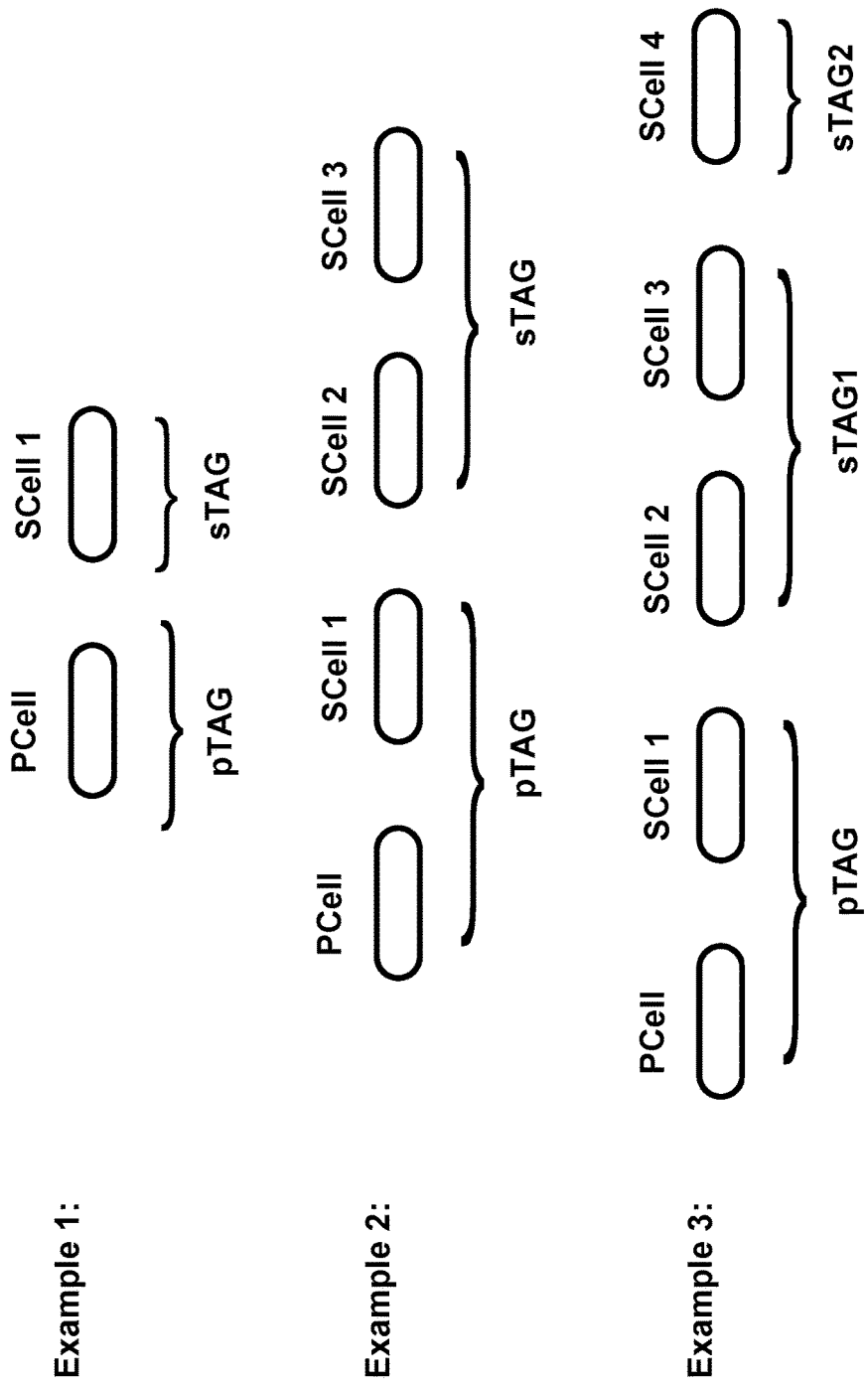
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
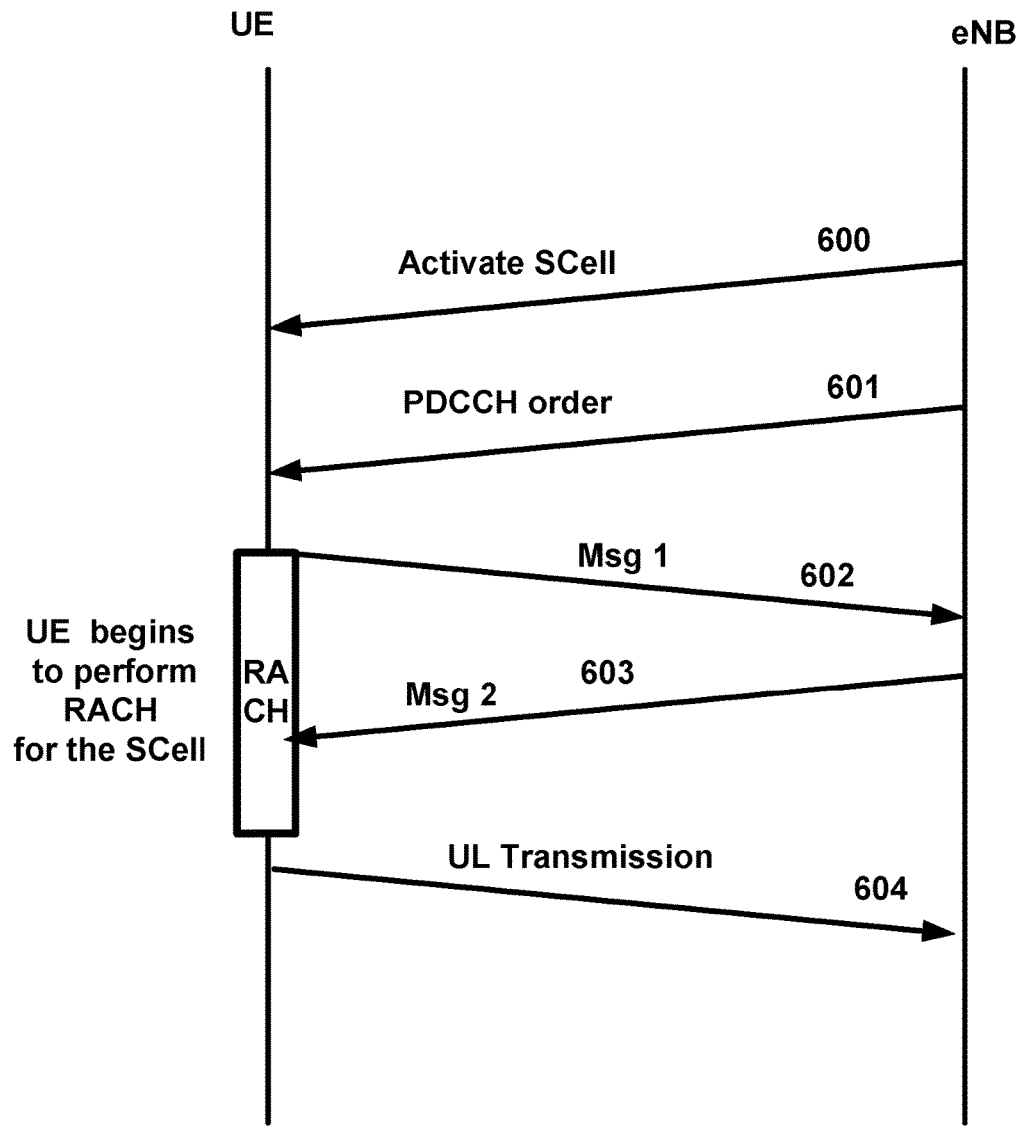
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed or configurable. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel. In an example, an eNB may transmit one or more LBT configuration parameters in one or more RRC messages and/or one or more PDCCH DCIs. In an example, some of the LBT parameters may be configured via RRC message(s) and some other LBT parameters may be signaled to a UE via PDCCH DCI (e.g. a DCI including the UL grant).

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

The following signals or combination of the following signals may provide functionality for the UE's time/frequency synchronization for the reception of a DL transmission burst in LAA SCell(s): a) serving cell's DRS for RRM measurement (DRS for RRM measurement may be used at least for coarse time/frequency synchronization), b) reference signals embedded within DL transmission bursts (e.g. CRS and/or DMRS), and/or c) primary/secondary synchronization signals. If there is an additional reference signal, this signal may be used. Reference signals may be used at least for fine time/frequency synchronization. Other candidates (e.g., initial signal, DRS) may be employed for synchronization.

DRS for RRM may also support functionality for demodulation of potential broadcast data multiplexed with DRS transmission. Other mechanism or signals (e.g., initial signal, DRS) for time/frequency synchronization may be needed to support reception of DL transmission burst.

In an example embodiment, DRS may be used at least for coarse time/frequency synchronization. Reference signals (e.g., CRS and/or DMRS) within DL transmission bursts may be used at least for fine time/frequency synchronization. Once the UE detects DRS and achieves coarse time/frequency synchronization based on that, UE may keep tracking on the synchronization using reference signals embedded in other DL TX bursts and may also use DRS. In an example, a UE may utilize DRS and/or reference signals embedded within DL transmission burst targeting the UE. In another example, a UE may utilize DRS and/or reference signals embedded within many available DL transmission bursts from the serving cell (to the UE and other UEs).

The discovery signal used for cell discovery/RRM measurement (e.g. opportunistic transmission within configured DMTC) may be used for maintaining at least coarse synchronization with the LAA cell (e.g. <±3 μs timing synchronization error and <±0.1 ppm frequency synchronization error). DRS may be subject to LBT. Inter-DRS latency generally gets worse as Wi-Fi traffic load increases. It is noted that the inter-DRS latency can be rather significant. In example scenario, there may be 55% probability that the inter-DRS latency is 40 ms and there is 5% probability that inter-DRS latency is ≥440 ms. The inter-DRS latency as seen by the UE may be worse considering the possibility of misdetection by the UE. Discovery signal misdetection may be due to actual misdetection or due to UE unavailable for detection because of DRX inter-frequency measurement during DMTC occasion.

Depending on LAA DRS design, OFDM symbol boundary may be obtained by DRS. PCell and SCell timing difference may be kept, ±30 usec order. The aggregated cells may be synchronized to some extent, e.g. aligned frame timing and SFN. Thus, similar requirement may be applied to the PCell and LAA cells on the unlicensed band. In an example, a UE may not utilize timing and frequency of the PCell for coarse synchronization of LAA cells since the timing offset may be up to ~30 us (e.g. non-located) and frequency reference may not be reliable due to the band distance between PCell and LAA cell (2 GHz Pcell and 5 GHz LAA cell). PCell timing information also may be used for time synchronization at subframe or frame level. SCell(s) may employ the same frame number and subframe number as the PCell.

PCell timing information may provide some information for symbol synchronization. By synchronizing PCell, frequency difference observed by UE between PCell and LAA Scell may be up to 0.6 ppm. For example, after 300 ms, the amount of the time drift may be 0.18 usec at most. For LAA, path delay may be relatively small as the target coverage is small. With timing drift, the multi-path delay may be within cyclic prefix length.

According to some of the various aspects of embodiments, a UE may utilize a licensed band carrier as a reference for time/frequency synchronization for CA of licensed carrier and unlicensed carrier, for example when they are in the same group (e.g. co-located). When non-collocated eNBs support licensed band PCell and unlicensed band SCell separately in a CA scenario, there may exist maximum ~30 us timing difference between PCell and unlicensed band SCell. In an example embodiment, the frequency difference between the UE synchronized with PCell and unlicensed band SCell may observe at most 0.6 ppm. An LAA may provide functionality for time/frequency synchronization on unlicensed band at least for non-collocated CA scenario.

Example reasons of frequency difference may be 1) oscillator difference among PCell, SCell and UE, 2) Doppler shift and 3) fast fading aspect. The oscillator difference of 0.6 ppm offset in 5 GHz corresponds to 3 kHz offset. Subcarrier spacing of LTE numerology is 15 kHz. This offset may need to be taken into account before FFT operation. One of the reasons of oscillator frequency variation is the temperature. If the frequency difference is not obtained at the point of DRS reception, UE may need to buffer subsequent data transmission until UE obtains this frequency difference before FFT. The frequency offset caused by this may be obtained at the reception of DRS. Doppler shift may be small value for a low mobility UE. Fast fading and residual mismatch caused by 1) and 2) may be compensated during demodulation process similar to a licensed band. This may not require introducing additional reference signals for unlicensed band.

According to some of the various aspects of embodiments, a UE may be configured to perform inter-frequency measurements on the carrier frequency layer using measurement gaps for SCells that are not configured yet. SCell receiver may not be turned on and measurements may be performed using the Pcell receiver. When a cell is added as Scell but not activated ("deactivated state"), the UE may receive relevant system information for the SCell from the Pcell. UE may be configured to perform measurements on the Scell without measurement gaps. SCell receiver may need to be occasionally turned on (e.g. for 5 ms every 160 ms) for RRM measurements using either CRS or Discovery signals. Cells may be added as Scell and activated ("activated state"), then the UE may be ready to receive PDSCH on the Scell in all subframes. The SCell receiver may perform (E)PDCCH monitoring in every subframe (for self-scheduling case(s)). SCell receiver may buffer every subframe for potential PDSCH processing (for both self and cross-carrier scheduling cases).

The eNodeB may configure the UE to measure and report RRM measurements (e.g. including RSSI) on a set of carrier frequencies. Once a suitable carrier or a set of suitable carriers is determined, carrier selected may be added as an SCell by RRC (e.g. with ~15 ms configuration delay), followed by SCell activation (with ~24 ms delay). If an SCell is deactivated, the UE may assume that no signal is transmitted by the LAA cell, except discovery signal may be transmitted when configured. If an SCell is activated, the UE is required to monitor PDCCH/EPDCCH and perform CSI measurement/reporting for the activated SCell. In a U-cell, a UE may not assume that every subframe of activated LAA SCell contains transmission. For LAA carriers, channel access may depend on the LBT procedure outcome. The network may configure and activate many carriers for the UE. The scheduler may then dynamically select carrier(s) for DL assignment or UL grant transmission.

According to some of the various aspects of embodiments, the first stage of cell level carrier selection may be during initial set up of a cell by an eNB. The eNB may scan and sense channels for interference or radar detection. eNB may configure the SCells accordingly based on the outcome of its carrier selection algorithm for efficient load balancing and interference management. The carrier selection process may be on a different time scale from the LBT/CCA procedure prior to transmissions on the carriers in unlicensed spectrum. The RSSI measurement report from UE may be used to assist the selection at eNB.

According to some of the various aspects of embodiments, the second stage of cell level carrier selection is after initial set up. The motivation is that eNB may need to do carrier (re)selection due to static load and interference change on some carriers, e.g., a new Wi-Fi AP is set up and continuously accesses the carrier causing relatively static interference. Therefore, semi-static carrier selection may be based on the eNB sensing of the averaged interference level, potential presence of radar signals if required, and traffic load on the carriers over a relatively longer time scale, as well as RRM measurement from UEs in the cell. Due to the characteristics in unlicensed spectrum, RRM measurements on LAA SCells may be enhanced to support better carrier selection. For example, the RSSI measurement may be enhanced using occupancy metric indicating the percentage of the time when RSSI is above a certain threshold. It may be noted that cell level carrier selection may be a long-term (re)selection since the process may be rather costly due to the signalling overhead and communication interruptions for UEs in a cell and it may also affect the neighbouring cells. Once a suitable set of carriers is identified, they may be configured and activated as SCells for UEs. This process may be continuous in order to keep reassessing the interference environment. Cell-level carrier selection in unlicensed spectrum may be a relatively long-term (re)selection based on eNB sensing and RRM measurement report from UE. RRM measurement on LAA SCells may be enhanced to support better carrier selection.

Carrier selection from UE perspective may be to support carrier selection for a UE among the set of carriers that the eNB has selected at the cell level. Carrier selection for the UE in unlicensed spectrum may be achieved by configuring a set of the carriers on which the UE supports simultaneous reception and transmission. The UE may perform RRM measurements on the configured carriers and report them to the eNB. The eNB may then choose which of the carriers to activate and use for transmission when it has pending data for the UE. The number of carriers to activate may then also be chosen based on the data rate needed and the RRM measurements for the different carriers. The activation delay for a carrier before scheduling data on it may be up to ~24 ms, assuming that the UE has performed RRM measurement on this carrier prior to receiving the activation command within DRX cycle. By operating the carrier selection based on activation and deactivation, the selection may also be done in the order of tens of ms.

According to some of the various aspects of embodiments, CRS may not be transmitted in an activated subframe when a burst is not scheduled in that subframe. If there are no transmissions from the eNB for an extended duration (Toff), UE demodulation performance may be impacted due to lack of reference symbols for fine time/frequency tracking. The extent of performance impact depends on the amount of time for which there are no eNB transmissions. The impact may be mitigated by more frequent transmission of discovery signals.

Discovery signals may be transmitted by the eNB even when UEs are not being scheduled. Setting discovery signal periodicity based on UE RRM measurement requirements (e.g. 160 ms) may be more efficient than setting the periodicity based on UE fine time/frequency tracking requirement.

In an example embodiment, Scell deactivation timer for the unlicensed Scell may be set to a value closer to (Toff) based on UE fine time/frequency tracking requirements. This may result in more frequent transmission of activation commands Activation commands may be needed when the eNB has data to schedule to a UE. From the UE perspective, after receiving an activation command in a particular subframe, the UE may receive CRS in a number (e.g. one or two) of following subframes. The UEs may receive CRS transmissions for a few symbols or subframes, which they may use for settling AGC loop and time-frequency tracking filters before PDSCH reception on the SCell. UEs may receive CRS transmission (e.g. in a few OFDM symbols) between reception of activation command and reception PDSCH on the Scell.

Activating a large number of carriers on dynamic bases may increase the UE power consumption, false alarm probability, and processing power requirements Improved mechanisms are needed to improve efficiency in the UE and enable fast and dynamic carrier selection/activation in a UE. Novel mechanisms may reduce UE power consumption, reduce false alarm probability and reduce processing power requirements. Carrier selection and activation may be enhanced to achieve fast dynamic carrier selection (or switching). A fast activation procedure for the carrier (e.g. shorter than the currently defined 24 ms) may be defined to improve efficiency.

Current SCell activation latency may include the MAC CE decoding latency (~3-6 ms) and SCell activation preparation time (RF preparation, up to ~18 ms) Implementation of faster processes and hardware may reduce these delays. SCell MAC activation/deactivation signalling is UE-specific. Signalling overhead may be a concern especially if the cell used for transmitting the signal is a macro cell. In an example embodiment, a L1 procedure/indicator may be introduced and/or SCell activation signalling may be enhanced.

Layer one signalling (e.g. PDCCH/EPDCCH from the PCell or another serving cell) may be implemented to signal the set of carriers that the UE may monitor for PDCCH/EPDCCH and/or measuring/reporting CSI. Control signalling latency may be ~2 ms (e.g. one 1 ms EPDCCH transmission plus 0.5 ms decoding). The DCI format may be of small size for transmission reliability and overhead reduction. To reduce control signalling overhead, the signalling may be a UE-common signalling. The indication may be sent on a carrier that the UE is currently monitoring.

In an example embodiment, a mechanism based on a L1 indication for starting/stopping monitoring of up to k activated carriers may be provided. The UE may be configured with n>=k CCs. k CCs may be activated via MAC signalling of SCell activation/deactivation. Then based on LBT progress over the CCs, a L1 indication is sent to inform which of the k CCs may be monitored by the UE and which may not. The UE may then receive data burst(s) on the monitored CCs. Another L1 indication may be sent after the bursts to alter which CCs may be monitored since then, and so on. The L1 indication may be explicit (e.g., based on a signalling) or implicit (e.g., based on self-scheduling and UE detection of scheduling information on the SCell). For this example, fast carrier switching is done among at most k CCs.

In an example embodiment, a mechanism based on a L1 signalling for starting/stopping monitoring of up to m activated carriers (the number of p configured carriers may be m or higher). The activated carriers may be more than n (e.g., there may be more CCs activated for the UE than its PDSCH aggregation capability-n). The UE is configured with p CCs, and there may be up to m CCs that are activated via MAC signalling of SCell activation/deactivation. The UE may not monitor all the activated CCs. The UE may monitor at most n CCs according a L1 indication. The L1 indication needs to be explicit rather than implicit, since an implicit indication may require a UE to monitor all the up to m activated carriers at the same time, exceeding the UE's capability. For this example, fast carrier switching is done among possibly more than n CCs.

According to some of the various aspects of embodiments, SCell activation/deactivation enhancements may be considered for fast carrier switching. SCell activation/deactivation signalling is a MAC signalling. MAC signalling decoding/detection (with or without enhancements) may be slower than L1 signalling decoding/detection. It may involve decoding/detection of a L1 signalling and furthermore, a PDSCH. If SCell activation/deactivation is carried by a L1 signalling, it may still be considered for fast carrier switching. In an example embodiment, a mechanism based on a L1 signalling for activation/deactivation of the p configured carriers. The UE is configured with p CCs, but each time there are at most n CCs are activated via a L1 signalling of SCell activation/deactivation. For instance, based on LBT progress over the CCs, a L1 signalling is sent to inform which of the p CCs are activated. The UE may receive data burst(s) on the activated CCs. Another L1 signalling may be sent after the bursts to alter the activated CCs. For this example, fast carrier switching is done among possibly more than n CCs.

The control signalling may be transmitted before the eNB has gained access to the carrier via LBT process. An eNB may inform the UE to start (or stop) monitoring a carrier (whether the UE would receive a burst or not depends on the presence of PDCCH scheduling information on the carrier). An indication for starting monitoring may be used for more than one burst, until an indication for stopping monitoring is sent. The indication may be sent when the eNB expects the (E) CCA is to complete soon. A purpose of the indication may be to inform a UE to start or stop monitoring a carrier.

Transmitting the control signalling after the eNB has gained access to the carrier may incur overhead of the reservation signal (proportional to the control signalling latency). In an example, the maximum transmission burst may be 4 ms. An eNB may inform the UE to receive a burst on a carrier. The eNB may send one indication for a burst. There may be many short bursts (e.g., one burst may last up to 4 milliseconds in certain regions). The indication may be sent after (E)CCA is completed, consuming some portion of the maximum allowed transmission duration for a burst.

It may still be up to the network to transmit the control signalling before or after the channel is occupied. A UE may detect that the burst is from the serving cell (e.g. by confirming PCID). The function of the control signalling is to indicate that the UE may perform DL transmission burst detection of the serving cell. If a DL burst of the serving cell is detected, UE may monitor for possible PDCCH/EPDCCH and/or measuring the CSI on the indicated SCell.

In an example embodiment, a UE may be configured with a number of carriers potentially exceeding the maximum number of carriers over which the UE may aggregate PDSCH. RRM measurements over the configured carriers may be supported, e.g. RSSI-like measurement, extension of quasi co-location concept to across collocated intra-band carriers, and/or carrier grouping. L1 indication to the UE to start monitoring a carrier, which is selected from the configured carriers by the eNB may be supported.

According to some of the various aspects of embodiments, an eNB may configure UE with more component carriers which may potentially exceed the maximum number of carriers over which the UE may aggregate PDSCH. Then eNB may activate one or more carriers among the configured carriers to UE by the existing signalling, e.g. MAC signalling. UE may be scheduled on the one or more activated carriers dynamically based on the LBT mechanism.

A UE may switch to receive on any carrier within a set of carriers selected by the serving eNB as fast as subframe/symbol-level, while the number of carriers within the set may potentially exceed the maximum number of carriers over which the UE may aggregate PDSCH. Which carrier(s) the UE may switch to is per eNB indication. When the UE is indicated with the carrier(s) it may switch to, the UE may start to monitor the indicated carrier(s), e.g. within a few subframes, and may stop monitoring other carriers. By monitoring a carrier it meant to buffer and attempt to detect the control channels and other associated channels. The eNB indication may instruct the UE to switch to the indicated carrier(s) and monitor the carrier(s). The eNB may not instruct the UE to switch to monitor on more carriers than its PDSCH aggregation capability in a given subframe. The eNB may not schedule the UE on more carriers than its PDSCH aggregation capability. SCell configuration enhancements may allow both semi-static and fast carrier switching with reduced transition time. The delay associated with the SCell configuration signalling as well as the delay associated with the measurement process may be decreased.

In an example embodiment, fast carrier switching may support UE to switch to any carrier within a set of carriers selected by the serving eNB as fast as a few subframes/symbols. The eNB may send an indication instructing the UE to switch to the indicated carriers and monitor the carriers. Then the UE may perform the switching and start monitoring the indicated carriers. The UE stops monitoring other carriers. The eNB indication may be done in L1. A L1 procedure/indicator, or an enhancement of the SCell activation signalling may be introduced.

According to some of the various aspects of embodiments, DRS design may allow DRS transmission on an LAA SCell to be subject to LBT. The transmission of DRS within a DMTC window if LBT is applied to DRS may consider many factors. Subjected to LBT, DRS may transmitted in fixed time position within the configured DMTC. Subject to LBT, DRS may be transmitted in at least one of different time positions within the configured DMTC. The number of different time positions may be restricted. One possibility is one-time position in the subframe. DRS transmissions outside of the configured DMTC may be supported.

According to some of the various aspects of embodiments, a sensing interval may allow the start of a DL transmission burst (which may not start with the DRS) containing DRS without PDSCH within the DMTC. Total sensing period may be greater than one sensing interval. Whether the above may be used for the case where transmission burst may not contain PDSCH but contains DRS, and any other reference signals or channels. The ECCA counter used for LBT category 4 for the PDSCH may be frozen during DL transmission burst containing DRS without PDSCH The RS bandwidth and density/pattern of the DRS design for LAA may support for RRM measurement based on a single DRS occasion.

According to some of the various aspects of embodiments, Discovery signal may be transmitted via a successful LBT operation. When the eNB does not have access to the channel, the discovery signal burst may not be transmitted. In an example, the discovery signal periodicity is configured to be 40 ms, and it may be possible to receive the discovery signal at least once in every 160 to 200 ms with a high probability. For example, the probability of receiving a discovery signal burst at least once in every 160 ms may greater than 97%. The UE may adjust its receiver processing to account for the potential absence of discovery signals due to lack of access to the channel. For instance, the UE may detect the presence or absence of a particular discovery signal burst using the PSS, SSS and CRS signals.

According to some of the various aspects of embodiments, the use of discovery signals that may be subject to LBT. A discovery signal burst may not be transmitted when LBT fails. Data may be transmitted in the intervening subframes. The reference signals along with control information may be used to reserve the channel prior to a discovery signal or data transmission.

For reception of data on the serving cell, AGC and fine time and frequency estimation may employ the discovery signals from the serving cell. In an example, time and frequency estimation may be performed using the PSS, SSS and/or CRS inside the discovery signal subframes. The use of two or more CRS ports may enhance synchronization performance. These signals may provide synchronization estimates that are adequate for the purpose of RRM measurements on the serving and neighboring cells. When data is to be received by the UE in a subframe that occurs a significant number of subframes after the last reception of a discovery signal on the serving cell. Fine tuning of the time and frequency estimates may be performed using the DM-RS and, if present, the CRS within the subframe in which data is received, and/or the initial signal. The signal used to reserve the channel before the actual start of data transmissions (e.g. reservation signal, initial signal, and/or burst indicator) may be used to fine tune time and frequency estimates before the reception of data. When transmitting data after a long absence of any discovery signal or other transmissions, the eNB may transmit a signal of longer duration to reserve the channel in order to facilitate the use of such a signal for timing and frequency adjustments.

In LTE-A release 12 or before almost blank subframes (ABS) can be configured for PCell and PSCell. For example, the UE may not receive data in an almost blank subframes. ABS may be employed to control interference between the base stations Enhanced ICIC may be implemented in which potentially interfering base station may transmit in different subset of subframes. This may reduce inter-cell interference in the network Implementation of ABS for LAA cells can be inefficient. It may result in transmitting short bursts Implementation of ABS for LAA cells may not be efficient for battery power consumption and processing in an eNB, because eNB may perform LBT in a subframe, get access to it, and then stop transmission when it reaches an ABS subframe even if its downlink burst just started Implementation of ABS may also not be efficient for a UE in terms of blind decoding and battery power consumption. New mechanisms may be implemented to enhance interference management, reduce processing requirements, and increase efficiency when multiple cells share an unlicensed frequency band.

In an example embodiment, an eNB transmits one or more RRC message to configure a plurality of cells including configuration parameters for one or more LAA cells. The configuration parameters for an LAA cell may include physical and MAC layer parameters for the cell. In an example embodiment, the configuration parameters may include one or more parameters indicating a subset of subframes. The one or more parameters may include a bitmap indicating the subset of the subframes. For example, a 40 bits or 10 bits bitmap may indicate the subset of subframes. For example, bit map [0010101001 0010101001 0010101001 0010101001] may indicate a subset of subframe. Each bit may represent a subframe. The subframes mapped to zero may not be in the subset. The bitmap may be applicable to subframes starting from a frame and a subframe according to a predefined rule. In an example, a 10-bit bitmap [0010101001] may indicate a subset of subframes consisting of subframes 2, 4, 6, and 9 in a plurality of frames.

In an example, the one or more parameters may be used to specify a subframe pattern. The first/leftmost bit corresponds to the subframe #0 of the radio frame satisfying SFN mod x=0, where SFN is that of PCell and x is the size of the bit string divided by 10. "1" denotes that the corresponding subframe is used.

The bitmap format for the one or more parameters is an example implementation. Other formats may be implemented. For example, the one or more parameters may include a subframe configuration index identifying a certain predefined subframe configuration. In an example, the one or more parameters may be presented by a bitmap of for example 6 bits which selects a subset of 6 predefined subframes in a frame, and the other 4 subframes may be configured using another method. Other example format for the one or more parameters may be implemented.

In an example no subframe pattern may be configured (the configuration parameter may be released). In such a case all the subframes, or a predefined subset of subframes may be considered as the configured subframe for LBT.

Figure 10:
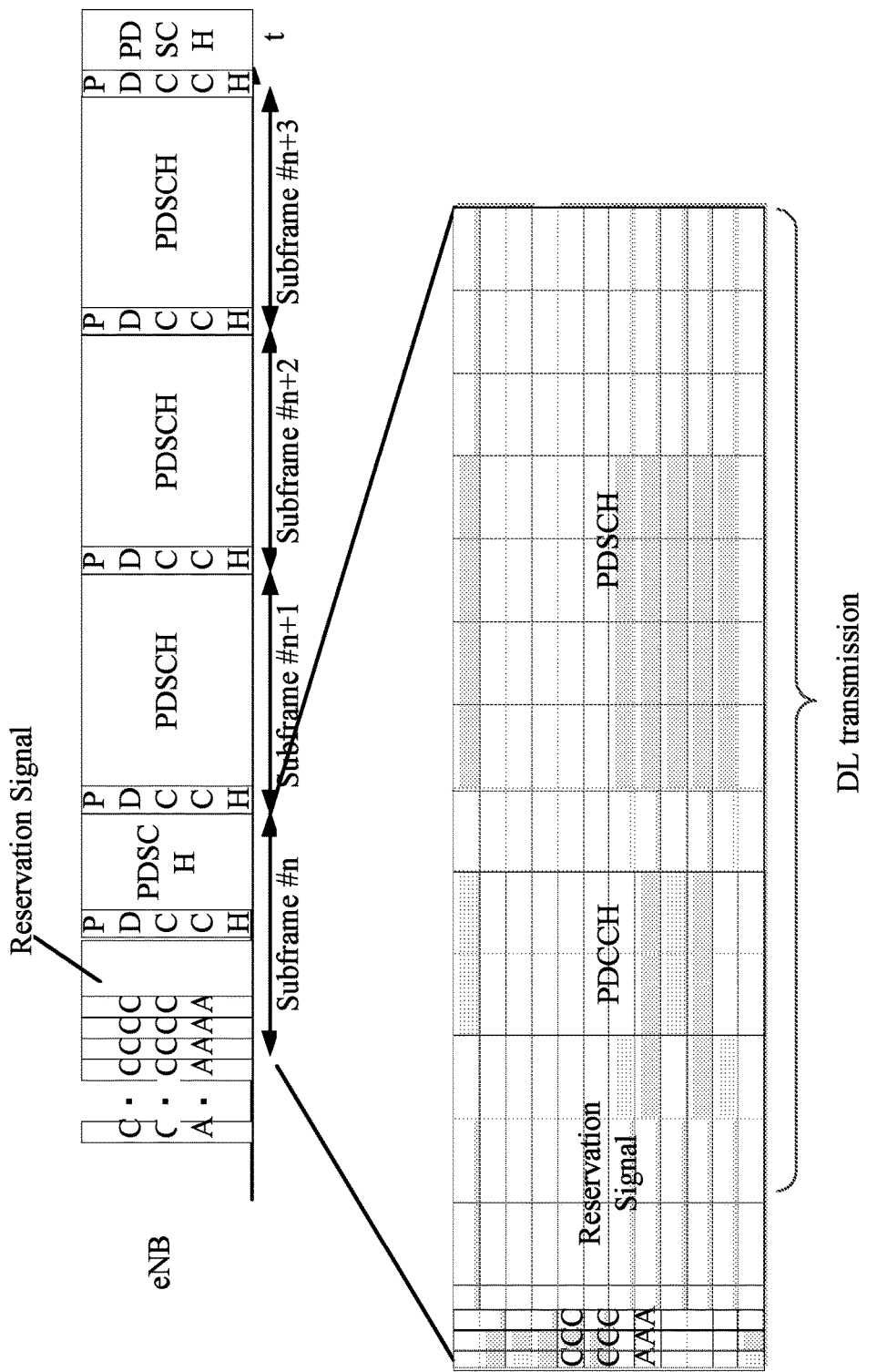
FIG. 10 is an example diagram depicting a downlink burst as per an aspect of an embodiment of the present invention.

In an example embodiment, in an unlicensed cell, a downlink burst may be started in the subset of subframes configured by RRC. A burst may not start in any arbitrary subframes. Possible starting subframe of the downlink burst may be defined by the subset of subframes identified by the one or more parameters. When an eNB accesses the channel it may transmit for a duration of one or more subframes. The duration may depend on a maximum configured burst duration in an eNB, the data available for transmission, and/or eNB scheduling algorithm FIG. 10 shows an example downlink burst in an unlicensed (e.g. licensed assisted access) cell.

The maximum configured burst duration in the example embodiment may be configured in the eNB. An eNB may transmit the maximum configured burst duration to a UE employing an RRC configuration message.

An example is shown in the following figure. The eNB may perform LBT for downlink burst transmission in subframes indicated as 1, and may not perform LBT in subframes indicated as zero. When the eNB obtained channel access, then the eNB may transmit for a limited duration of time.

In an example embodiment, the downlink burst may be applicable to downlink data bursts. Downlink data bursts may be started in the subset of subframes configured by RRC message. The duration of the DL data burst may depend on eNB configuration, and eNB scheduling mechanism. In an example embodiment, the maximum duration of a downlink data burst may be 4 msec.

Figure 11A:
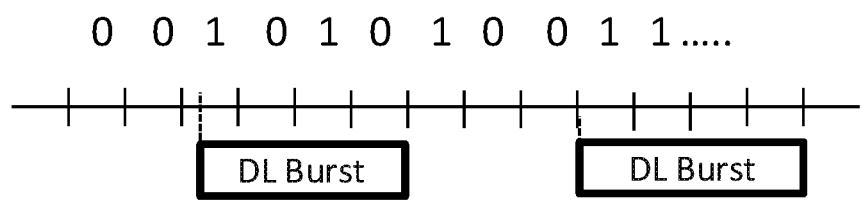
FIG. 11A and FIG. 11B are example diagrams depicting subframe configuration as per an aspect of an embodiment of the present invention.

As shown in example FIG. 11(A), the eNB may transmit a downlink burst during the subframes indicated as zero in the bitmap. The eNB may not start a downlink burst in a subframe indicated as zero in the bitmap. On non-LBT subframes, base station may not start a burst while it may transmit an already started burst.

In an example embodiment, the UE may blind decode and monitor for the start of a downlink burst in the configured subset of subframes. This may reduce the processing requirements and battery power consumption in a UE. Various downlink signal/channel blind decoding and monitoring examples are presented in the example embodiments.

Figure 11B:
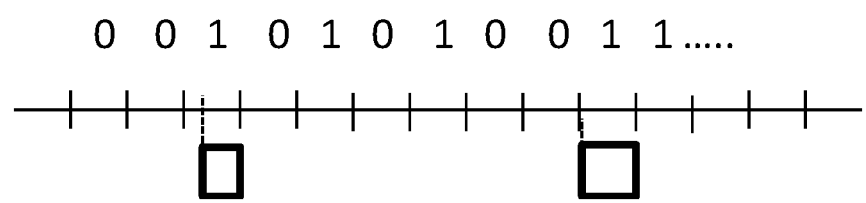

In an example embodiment, the downlink burst may be applicable to downlink bursts, such as DRS, CSI RS, CRS. SS signal and/or other predefined signals (e.g. initial signal, burst indicator, etc.). Downlink bursts may be started in the subset of subframes configured by an RRC message. The duration of the DL burst may depend on eNB configuration parameters and/or eNB scheduling mechanism. Example FIG. 11(B) shows an example embodiment with a short burst duration.

In an example implementation, a similar mechanism may be implemented for uplink subframes assigned to a UE. An LAA cell may be configured with an uplink carrier. When a cell in a UE is configured with uplink, a subset of subframes may be configured for starting uplink bursts by a UE. Example embodiments may be extended to configure transmission of uplink signals by UEs.

FIG. 12 shows an example subframe configuration in an example embodiment. In the example, BS1, BS2, and BS3 are neighbouring BSs. In this example, these BSs do not compete for starting a burst in a given subframe and a given subframe is assigned to one of the BS1, BS2 and BS3. In this example, BS1 and BS2 share a coverage area. The first plurality of LBT subframes of BS1 and the second plurality of LBT subframes of BS2 are disjoint. Such configuration is applicable to BS1, BS2 and BS3. In this example, BS4 may not share a substantial coverage area with BS3. BS3 and BS4 may perform LBT in the same subframe. The following figure is an example configuration and different configurations may be implemented based on network design requirements.

In an example, the configuration of the subset of subframes employed for LBT may be coordinated among multiple base stations (eNBs). The eNBs may directly communicate with each other. For example, a first eNB may transmit one or more first messages to a second eNB. The one or more messages may comprise configuration parameters indicating the subset of subframes employed for LBT for one or more LAA cells. In an example embodiment, the first and second eNB may receive their LBT subframe configuration from another network node. In an example embodiment, a network node may coordinate LBT subframe configuration among a plurality of base stations.

According to some of the various aspects of embodiments, LBT resource partitioning may be employed for interference management and/or load balancing in co-channel deployments. To reach its full potential, resource partitioning may be paired with interference-cancellation-capable wireless devices. Similar approaches may be applied to micro, pico, femto, and relay nodes. Each node may have its own mechanisms. For example, the X2 backhaul link between the macro and relay base stations may be over an LTE air interface. In another example, closed femto cells may create their own interference challenges. Femto base stations may or may not include an X2 interface and employ static or dynamic interference management methods using OAM-based or similar solutions.

According to some of the various aspects of embodiments, adaptive LBT control for LAA in LTE may be enabled through X2 backhaul coordination of resources used for LBT subframes. According to some of the various aspects of embodiments, adaptive LBT control for LAA in LTE may be enabled through a third network node coordinating resources used for LBT subframes. In another example, LBT subframes may be preconfigured in an eNB. The granularity of the negotiated LBT resource may be a subframe. One of the various motivations behind resource partitioning may be to control channel access among multiple network nodes. In an example, LBT subframes may be coordinated among eNBs of different service providers. The coordination may be performed directly or indirectly via a network node.

In an example embodiment, LBT resources may be coordinated among different service providers in a given area. A given service provider may be assigned its own subset of subframes for performing LBT. The given service provider, may assign a first subset of the subset of subframes to an eNB in the given service provider. The eNBs in the given service operator network may coordinate the use of LBT subframes among themselves. In an example embodiment, the LBT subframes assigned to a given service provider may dynamically change. A third network node may coordinate the assignment of LBT subframes among different service provides. Then a given service provider may assign the obtained LBT subframes among eNBs of the given service provider in a coverage area.

In an example embodiment, a central database may store the LBT subframe configuration of different service operators and/or eNBs. A service provider node (e.g. eNB or another network node) may communicate with the central database and receive a message comprising configuration information about LBT subframes for the service provider and/or other service providers in a specific area. A service provider node may request for information on LBT configuration. The request may comprise a suggested LBT subframe, and/or may include a request for information about the available LBT subframes. The service operator may receive an assignment of LBT subframes from the central database. The LBT subframe configuration of one or more base station in the specific coverage area may be based on the configuration parameters received from the central database.

In an example, a first node (e.g. an eNB) may transmit a message to one or more second nodes (e.g. eNB) comprising configuration parameters (e.g. a bit map) indicating which resources may be utilized for LBT of one or more unlicensed cell of the first node. The second nodes may be made aware of the LBT subframe pattern from the first base station. The second base station(s) may perform LBT in the cell in other subframes not overlapping with the first base station LBT subframes. The message may comprise an eNB ID. The message may comprise an ID for an LAA cell, and LBT subframes configuration for the LAA cell.

In an example, a high-power node (macro base station) may inform the low-power node (pico base station) of which resources may be utilized for LBT of one or more unlicensed cell. Low-power nodes may be made aware of the LBT subframe pattern from a high-power base station and may perform LBT in the cell in other subframes.

In an example implementation, an eNB may receive its LBT subframes configuration from another network node. In an example, an eNB may derive its LBT subframes configuration parameters from configuration parameters received from another node. For example, eNB may derive its LBT subframes configuration parameters from one or more parameters received from a network server. For example, eNB may derive its LBT subframes configuration parameters from one or more parameters received from another eNB.

According to some of the various aspects of embodiments, the X2 interface may enable direct base station to base station interface coordination for performing LBT. Co-channel deployments of unlicensed spectrum may require coordination of LBT subframes. LBT subframes may coordinate LBT process and different nodes may not compete in starting a burst in a given subframe. On non-LBT subframes, base station may not start a burst while it may transmit an already started burst.

LBT coordination using LBT subframes may be performed by means of a bitmap. Each bit in the bitmap may be mapped to a single subframe. The size of the bitmap may be, for example, 40 bits, resulting in the LBT pattern repeating itself after 40 ms. In another embodiment, data may be scheduled in non-LBT subframes at a substantially lower power.

Communication of LBT subframe configuration between nodes may be peer to peer. Or it may be in a master-slave relationship. In an example scenario, a macro base station may be a master, and a pico base station may be a slave. In an example scenario, a first type of base station may be a master, and a second type of base station may be a slave. In another example, base stations may be selected as master and slave according to a configuration parameter. In another example, a third network node may coordinate and/or communicate LBT subframes among multiple base stations.

According to some of the various aspects of embodiments, subframe resource partitioning may create an interference pattern and/or load balancing that may require a new radio resource measurement paradigm.

In an example embodiment, a base station may broadcast an LBT subframe configuration. For example, the base station may employ MBSFN (multi-cast, broadcast, single frequency network) subframe configuration broadcast or unicast messages. An example broadcast message is an RRC system information block. MBSFN or LBT subframe configurations may include a radio frame allocation period, a radio frame allocation offset, a subframe allocation bitmap, any combination of these parameters, or the like. A radio frame allocation period may be 1, 2, 4, 8, 16 or 32 frames. A radio frame allocation offset may be a number between 1 to 7 subframes. A subframe allocation bitmap may be for one frame or four frames. Radio frames that contain MBSFN/LBT subframes may occur when equation (SFN mod radio Frame Allocation Period=radio Frame Allocation Offset) is satisfied. Values 1 and 2 may not be applicable to radio frame allocation period when four Frames are used.

According to some of the various aspects of embodiments, a subframe allocation bitmap may define the subframes that are allocated for MBSFN within the radio frame allocation period defined by the radio frame allocation period and the radio frame allocation offset. A subframe allocation bitmap for one frame may be six bits long and for four frames may be 24 bits long. In a bit-map indicating MBSFN/LBT subframe allocation in four consecutive radio frames, a "1" may denote that the corresponding subframe is allocated for MBSFN/LBT. The bitmap may be interpreted as follows: For FDD: Starting from the first radio frame and from the first/leftmost bit in the bitmap, the allocation may apply to subframes #1, #2, #3, #6, #7, and #8 in the sequence of the four radio-frames. For TDD: Starting from the first radio frame and from the first/leftmost bit in the bitmap, the allocation applies to subframes #3, #4, #7, #8, and #9 in the sequence of the four radio-frames. The last four bits may not be used. Uplink subframes may not be allocated.

Other example configurations may be implemented. For example, an MBSFN subframe configuration may be used to introduce LBT subframes and subframes used for scheduling release 13 or above wireless devices. For example, an MBSFN configuration may introduce subframe 1, 3, 6 and 8 as MBSFN subframes in a frame. Then MBSFN subframe 1 may be used for scheduling release 13 or above wireless devices, and MBSFN subframe 3, 6, and 8 may be used as LBT subframes. Therefore, as seen in this example, MBSFN configuration may indicate other types of subframes in addition to LBT. In another configuration, a base station may use one or many of MBSFN subframes for broadcasting or multicasting services. In a typical scenario, in which MBSFN may be configured, for example, for four frames, with a period of 40 msec, various configurations for combining LBT, MBSFN, and release 10 or above subframes may be possible. In this specification, LBT subframes may be called LBT subframes.

A network may comprise a plurality of base stations. Transmission time may be divided into a plurality of frames. Each frame in the plurality of frames may further be divided into a plurality of subframes. A first base station may comprise a communication interface, a processor, and a memory storing instructions that, when executed, cause the first base station to perform certain functions. According to some of the various aspects of embodiments, the first base station may transmit a first message to one or more wireless devices. The first message may comprise an initial subframe allocation bitmap indicating an initial plurality of LBT subframes.

After an increase in the number of the plurality of wireless devices or after an increase in the traffic load of the first base station by an amount greater than a load value, the first base station may transmit a second message. The second message may comprise an updated subframe allocation bitmap indicating an updated plurality of LBT subframes. The updated plurality of LBT subframes may comprise a larger number of LBT subframes than the initial plurality of LBT subframes.

The number of LBT subframes for a base station may increase or decrease depending a network load. For example, when an eNB has higher load (e.g. compared with its neighboring node, or compared with its previous load or expected load), the number of LBT subframe for the eNB may increase. For example, when an eNB has a lower load (e.g. compared with its neighboring node, or compared with its previous load or expected load), the number of LBT subframes for the eNB may decrease. An eNB may transmit a message to another node (e.g. another eNB or a network node). The message may comprise the updated LBT subframe configuration. In an example, the eNB may receive an updated LBT subframe configuration when the load increases or decreases from a network node. For example, the eNB may request for an updated LBT subframe configuration and may receive a response message comprising configuration parameters indicating the updated LBT subframes.

The configuration of LBT subframes may be controlled by a network node. In an example, the configuration of LBT subframes may be coordinated by direct or indirect communication among eNBs employing X2 interface or any other interface.

Example embodiments enable dynamic configuration of LBT subframes and dynamic adaptation of LBT subframes in one or more base stations to adapt to changes in the traffic load of one or more base stations. Such a dynamic configuration may increase air interface and backhaul overhead. Additional overhead in signaling may include additional RRC messages and additional X2 application protocol messages. The gains in air interface efficiency maybe due to increase in the LBT subframes in some of the cells with relatively high load. This may reduce the packet congestion in those cells and reduce packet transmission delay and/or packet loss and may increase cell throughput. Some of the network simulations/analysis shows that the benefits in air interface efficiency gains may be more than the negative impact due to additional overhead.

The example embodiments may add additional complexity in network operations, but instead it may increase the overall spectral efficiency in the network Improving battery power consumption in UE and/or eNB is another benefit of the disclosed embodiments. The dynamic operation may be triggered when the load is decreased by an amount greater than a load value or decreased by an amount greater than a load value. The operation may be performed selectively, by one or more base stations, and may be communicated to one or more other base stations. This dynamic configuration is different from other methods employed to increase cell capacity. It may require transmission and reception of additional RRC reconfiguration messages to reconfigure the air interface parameters in wireless devices in the coverage area and may require transmission and reception of additional X2 interface messages to other base stations.

There may be an X2 interface between the first base station and one or more second plurality of base stations. After an increase in the number of the first plurality of wireless devices, the first base station may transmit a message to at least one second base station. The message may comprise a first pattern bitmap indicating the updated first LBT subframe allocation compared with the initial LBT subframe allocation.

In an example embodiment, frame transmissions are substantially synchronized among different base stations. System frame number transmissions are synchronized among different base stations. For example, the same system frame number may be transmitted during frames transmitted substantially synchronously. Different cells of the same base station and different cells belonging to different base stations may transmit the same system frame number during the same frame that is transmitted substantially at the same time. Example embodiments, among other things, may enable an efficient configuration of LBT subframes in one or more base stations and/or may enable a more efficient load balancing and interference management. Such a synchronization among cells of the same base station and cells belonging to different base stations may increase backhaul overhead and network complexity. Additional complexity in network architecture may include additional mechanisms for frame synchronization among different base stations as well as mechanisms for synchronization in transmitting the same system frame number during synchronized frames.

In an example embodiment, GPS assisted or packet based synchronization mechanisms may be enhanced to include SFN synchronization among the base stations. The gains in air interface efficiency maybe due to load balancing and reduction in inter-cell interference. This may reduce the packet loss and may increase cell throughput. Some of the network simulations/analysis shows that the benefits in air interface efficiency gains may be more than the negative impact due to additional network complexity and overhead. The example embodiments may add additional complexity in network operations, but instead it may increase the overall spectral efficiency in the air interface. The synchronized operation may be triggered if the advantages in SFN synchronization is more beneficial compared to disadvantages due to the additional network complexity. Therefore, the operation may be performed selectively, by one or more base stations. This synchronized configuration is different from other network synchronization methods employed in, for example, TDD systems. It may require transmission and reception of additional messages to ensure synchronization in system frame number transmission (the same number is transmitted during the simultaneous frames of different base stations). This mechanism may require transmission and reception of additional X2 and/or S1 interface messages or additional GPS assisted mechanisms.

In an example embodiment, a system frame number coordinator may coordinate the transmission of the same system frame number in frames of different base stations. Control messages may trigger multiple base stations to start or re-start the SFN transmission at the same time starting from the same initial number. This mechanism requires additional complexity compared with transmission of the same SFN in frames of different cells of the same base station, since it requires protocols/mechanisms for coordination among many base stations. When a new base station is added to the network, additional mechanisms may be required to communicate with the new base station and ensure that the new base station transmits the same system frame number along with other base stations in the network. This may be achieved via control messages transmitted via X2 and/or S1 interface. In an example embodiment, a system frame number coordinator may communicate/transmit messages to the existing and new base stations to synchronize SFN transmission. Distributed algorithms and/or GPS bases algorithms may also be developed to ensure SFN synchronization among base stations.

In an example embodiment, LBT configuration may be included for example in the load indication message transmitted via X2 interface. In an example a first base station may transmit a message (e.g. load indication) indicating LBT parameters. For example, LBT parameters may include statistics on LBT success and/or failure rates. For example, an eNB may transmit a message to a second eNB indicating the duration in which the LBT was not successful. In an example embodiment, LBT configuration and/or one or more parameters in the load indication message may be transmitted to and/or received from a network node.

In an example, an eNB may initiate a load indication procedure by sending load information message to one or more eNBs controlling intra-frequency neighbouring cells.

In an example, if the UL Interference Overload Indication IE is received in the load information message, it may indicate the interference level experienced by the indicated cell on all resource blocks, per PRB. The receiving eNB may take such information into account when setting its scheduling policy and may consider the received UL Interference Overload Indication IE value valid until reception of a new load information message carrying an update of the same IE. If the UL High Interference Indication IE is received in the load information message, it may indicate, per PRB, the occurrence of high interference sensitivity, as seen from the sending eNB. The receiving eNB may try to avoid scheduling cell edge UEs in its cells for the concerned PRBs. The Target Cell ID IE received within the UL High Interference Information IE group in the load information message indicates the cell for which the corresponding UL High Interference Indication is meant. The receiving eNB may consider the value of the UL High Interference Information IE group valid until reception of a new load information message carrying an update.

In an example, if the Relative Narrowband Tx Power (RNTP) IE is received in the load information message, it indicates, per PRB, whether downlink transmission power is lower than the value indicated by the RNTP Threshold IE. The receiving eNB may take such information into account when setting its scheduling policy and shall consider the received Relative Narrowband Tx Power (RNTP) IE value valid until reception of a new load information message carrying an update. If the ABS Information IE is included in the load information message, the ABS Pattern Info IE may indicate the subframes designated as almost blank subframes by the sending eNB for the purpose of interference coordination. The receiving eNB may take such information into consideration when scheduling UEs.

In an example, the receiving eNB may use the Measurement Subset IE received in the load information message, for the configuration of specific measurements towards the UE. The receiving eNB may consider the received information as immediately applicable. The receiving eNB may consider the value of the ABS Information IE valid until reception of a new load information message carrying an update. If an ABS indicated in the ABS pattern info IE coincides with a MBSFN subframe, the receiving eNB may consider that the subframe is designated as almost blank subframe by the sending eNB. If the Invoke Indication IE is included in the load information message, it indicates which type of information the sending eNB would like the receiving eNB to send back. The receiving eNB may take such request into account. If the Invoke Indication IE is set to "ABS Information", it indicates the sending eNB would like the receiving eNB to initiate the Load Indication procedure, with the load information message containing the ABS Information IE indicating non-zero ABS patterns in the relevant cells.

In an example, LBT subframe configuration may be included for example in the load indication message transmitted via X2 interface. LBT subframe configuration may indicate one or more subframes as LBT subframes. In an example a first base station may transmit a message (e.g. load indication) indicating LBT parameters. For example, LBT parameters may include LBT thresholds and/or offsets and/or timer/counter information, and/or statistics on LBT success and/or failure information. For example, a first eNB may transmit a message to a second eNB indicating the duration in which the LBT was not successful, or LBT success/failure rates in one or more subframes. The first eNB may employ the information in handover, or updating cell configurations. In an example embodiment, LBT configuration and/or one or more parameters in the load indication message may be transmitted to and/or received from a network node.

Figure 13:
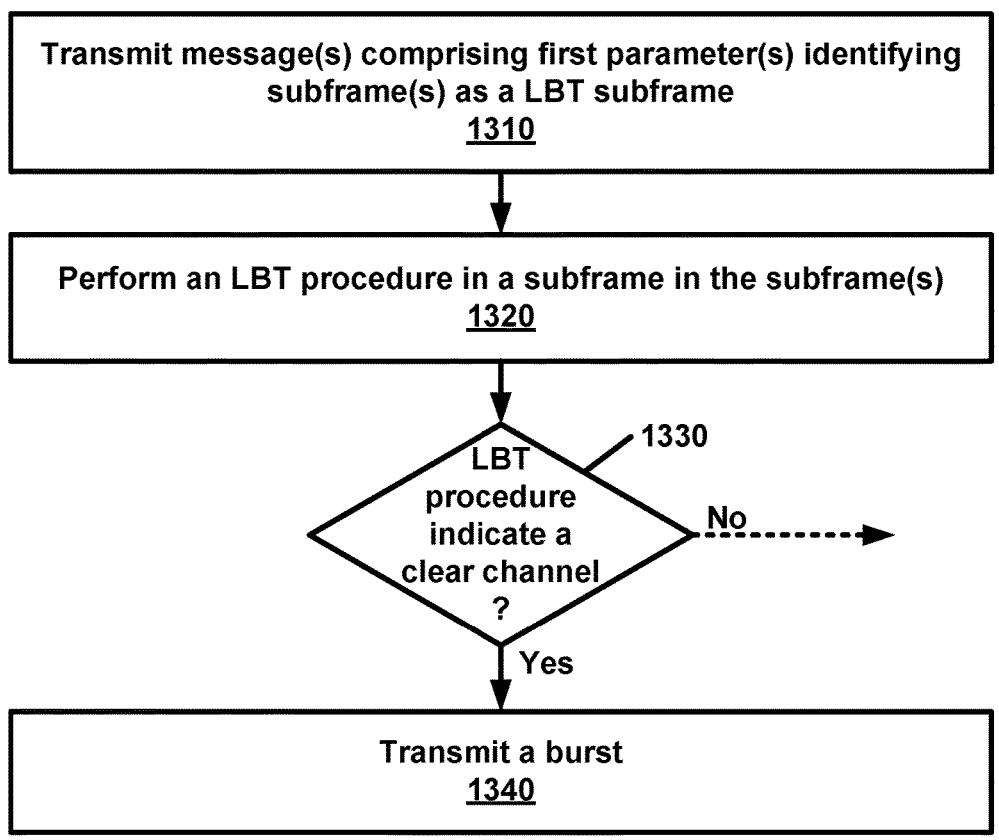
FIG. 13 is an example flow diagram as per an aspect of an embodiment of the present invention.

FIG. 13 is an example flow diagram as per an aspect of an embodiment of the present invention. The flow diagram may be processed as a method. The flow diagram may be executed by a base station. The base station may comprise one or more processors and memory storing instructions that, when executed, cause the base station to perform actions described in the flow diagram.

The base station may transmit at least one message at 1310. The at least one message may comprise comprising one or more first parameters. The one or more first parameters may identify one or more subframes as a listen-before-talk (LBT) subframe. At 1320, an LBT procedure may be performed in a subframe in the one or more subframe. A burst may be transmitted at 1340 when the LBT procedure indicates a clear channel (1330). The burst may be configurable to start in the subframe if the subframe is identified as an LBT subframe.

According to an embodiment, the one or more first parameters comprise a bitmap. According to an embodiment, the one or more first parameters may indicate a periodic pattern for the one or more subframes. According to an embodiment, a message in the at least one message may comprise a radio resource control (RRC) message. According to an embodiment, the at least one message may comprise a second parameter indicating a maximum duration for the burst. According to an embodiment, the at least one message may comprise one or more LBT parameters. According to an embodiment, the one or more subframes may be associated with a licensed assisted access (LAA) cell.

Figure 14:
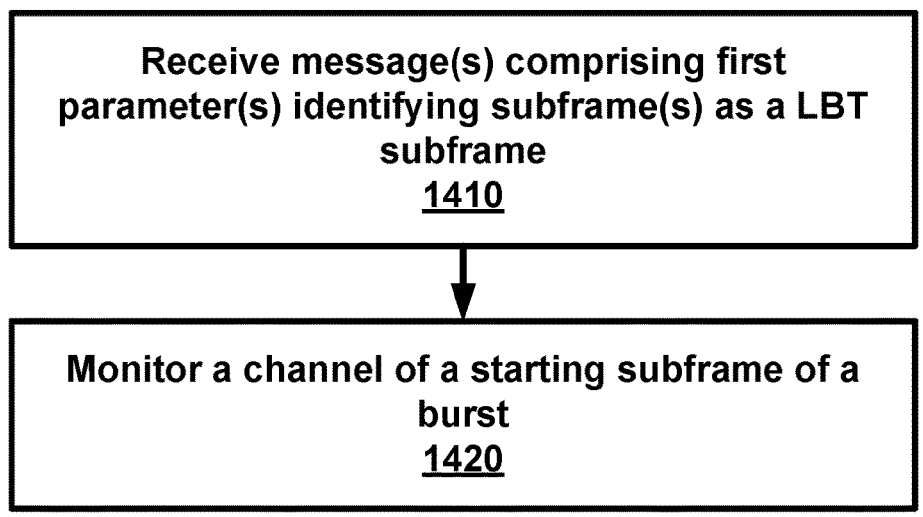
FIG. 14 is an example flow diagram as per an aspect of an embodiment of the present invention.

FIG. 14 is an example flow diagram as per an aspect of an embodiment of the present invention. The wireless device may be processed as a method. The flow diagram may be executed by a wireless device. The wireless device may comprise one or more processors and memory storing instructions that, when executed, cause the wireless device to perform actions described in the flow diagram.

The wireless device may receive at least one message at 1410. The at least one message may comprise one or more first parameters. The one or more first parameters may identify one or more subframes as a listen-before-talk (LBT) subframe. At 1420, the base station may monitor a channel of a starting subframe of a burst. The burst may be configurable to begin in the starting subframe if the starting subframe is identified as an LBT subframe.

According to an embodiment, the one or more first parameters may comprise a bitmap. According to an embodiment, a message in the at least one message may comprise a radio resource control (RRC) message. According to an embodiment, the one or more subframes may be associated with a licensed assisted access (LAA) cell. According to an embodiment, the one or more first parameters may indicate a periodic pattern for the one or more subframes. According to an embodiment, the at least one message may comprises a second parameter indicating a maximum duration for the burst. According to an embodiment, the at least one message may comprise one or more LBT parameters.

Figure 15:
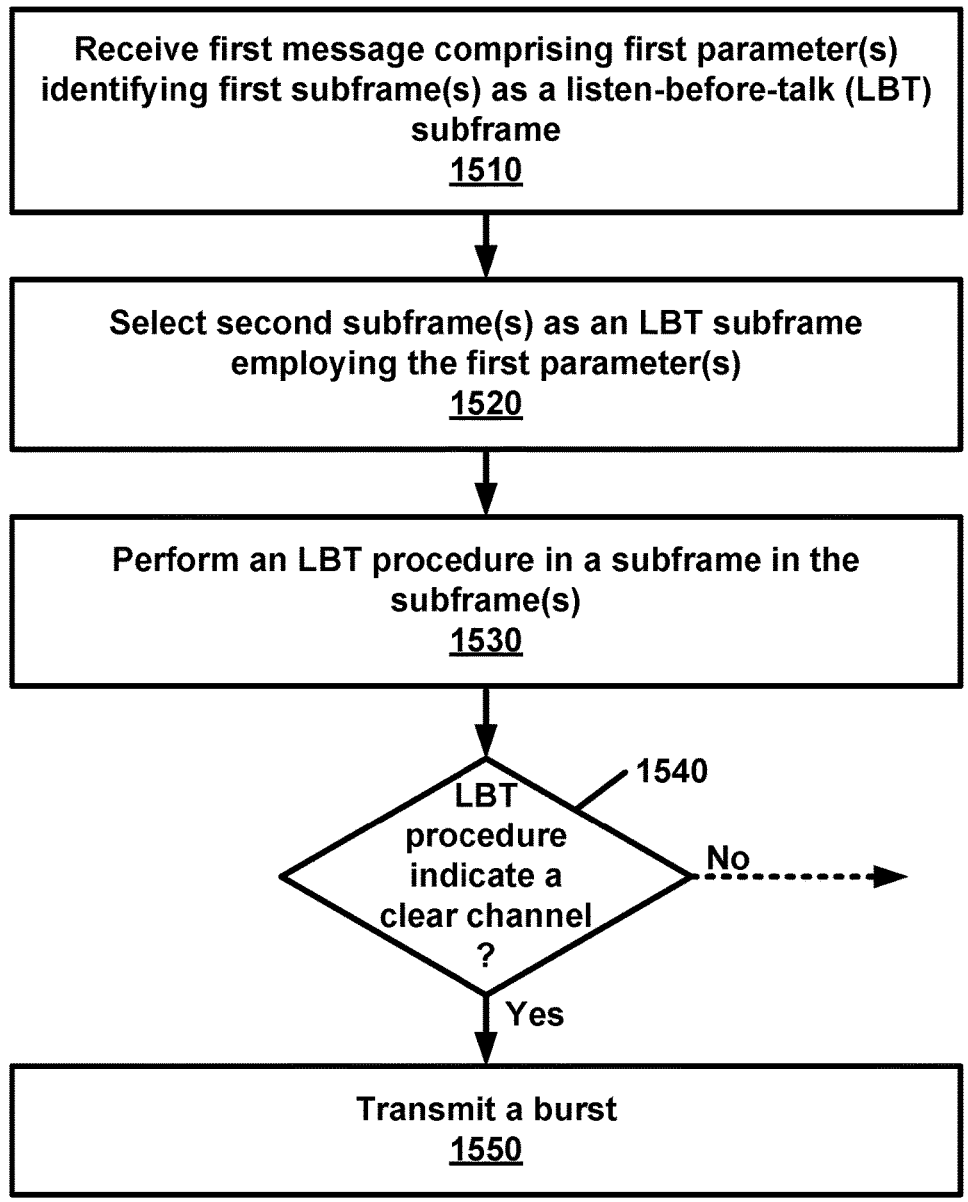
FIG. 15 is an example flow diagram as per an aspect of an embodiment of the present invention.

FIG. 15 is an example flow diagram as per an aspect of an embodiment of the present invention. The flow diagram may be processed as a method. The flow diagram may be executed by a base station. The base station may comprise one or more processors and memory storing instructions that, when executed, cause the base station to perform actions described in the flow diagram.

A first base station may receive a first message at 1510. The first message may comprise one or more first parameters. The one or more first parameters may identify one or more first subframes as a listen-before-talk (LBT) subframe. One or more second subframes may be selected at 1520 as an LBT subframe by the first base station employing the one or more first parameters. An LBT procedure may be performed in a subframe in the one or more subframes at 1530. A burst may be transmitted at 1550 when the LBT procedure indicates a clear channel at 1540.

According to an embodiment, the first base station may receive the first message from a second base station. According to an embodiment, the first base station may receive the first message from a network server. According to an embodiment, the one or more second subframes are the same as the one or more first subframes. According to an embodiment, the one or more second subframes exclude the one or more first subframes. According to an embodiment, the one or more second subframes are a subset of the one or more first subframes. According to an embodiment, the one or more first parameters comprise a bitmap. According to an embodiment, the first message may comprise a load indication message. According to an embodiment, the first message comprises one or more second parameters indicating a maximum burst duration.

According to an embodiment, the base station may further transmit a second message to a wireless device. The second message may comprise one or more second parameters indicating the one or more second subframes.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
   receiving, by a first base station from a second base station, a first message comprising one or more first parameters identifying a first plurality of subframes as a listen-before-talk (LBT) subframe of the second base station;

selecting a second plurality of subframes as an LBT subframe by the first base station based on the one or more first parameters;

transmitting, by the first base station to the second base station, a second message comprising one or more second parameters identifying the second plurality of subframes as a listen-before-talk (LBT) subframe of the first base station;

transmitting, by the first base station to one or more wireless devices, at least one radio resource control (RRC) message comprising one or more third parameters identifying the second plurality of subframes as a listen-before-talk (LBT) subframe;

performing, by the first base station, an LBT procedure in a subframe in the second plurality of subframes; and transmitting, by the first base station, a burst when the LBT procedure indicates a clear channel; and wherein the burst is configurable to start in the subframe if the subframe is identified as an LBT subframe.

2. The method of claim 1, wherein the one or more first parameters comprise a bitmap.

3. The method of claim 1, wherein the second plurality of subframes are associated with a licensed assisted access (LAA) cell.

4. The method of claim 1, wherein the one or more first parameters indicate a periodic pattern for the second plurality of subframes.

5. The method of claim 1, wherein the at least one RRC message comprises a second parameter indicating a maximum duration for the burst.

6. The method of claim 1, wherein the at least one RRC message comprises one or more LBT parameters.

7. A method comprising:

receiving, by a first base station from a second base station, a first message comprising one or more first parameters identifying a first plurality of subframes as a listen-before-talk (LBT) subframe of the second base station;

selecting a second plurality of subframes as an LBT subframe by the first base station based on the one or more first parameters;

transmitting, by the first base station to the second base station, a second message comprising one or more second parameters identifying the second plurality of subframes as a listen-before-talk (LBT) subframe of the first base station;

receiving, by a wireless device from the first base station, at least one radio resource control (RRC) message comprising one or more first parameters identifying the second plurality of subframes as a listen-before-talk (LBT) subframe; and monitoring, by the wireless device, a channel of a starting subframe of a burst; and wherein a burst is configurable to begin in the starting subframe if the starting subframe is identified as an LBT subframe.

8. The method of claim 7, wherein the one or more first parameters comprise a bitmap.

9. The method of claim 7, wherein the second plurality of subframes are associated with a licensed assisted access (LAA) cell.

10. The method of claim 7, wherein the one or more first parameters indicate a periodic pattern for the second plurality of subframes.

11. The method of claim 7, wherein the at least one RRC message comprises a second parameter indicating a maximum duration for the burst.

12. The method of claim 7, wherein the at least one RRC message comprises one or more LBT parameters.

13. A base station comprising:

one or more processors; and memory storing instructions that, when executed, cause the base station to:

receive, from a second base station, a first message comprising one or more first parameters identifying a first plurality of subframes as a listen-before-talk (LBT) subframe of the second base station;

select a second plurality of subframes as an LBT subframe by the base station based on the one or more first parameters;

transmit, to the second base station, a second message comprising second parameters identifying the second plurality of subframes as a listen-before-talk (LBT) subframe of the base station;

transmit to one or more wireless devices, at least one radio resource control (RRC) message comprising one or more third parameters identifying the second plurality of subframes as a listen-before-talk (LBT) subframe;

perform an LBT procedure in a subframe in the second plurality of subframes; and transmit a burst when the LBT procedure indicates a clear channel; and wherein the burst is configurable to start in the subframe if the subframe is identified as an LBT subframe.

14. The base station of claim 13, wherein the one or more first parameters comprise a bitmap.

15. The base station of claim 13, wherein the second plurality of subframes are associated with a licensed assisted access (LAA) cell.

16. The base station of claim 13, wherein the one or more first parameters indicate a periodic pattern for the second plurality of subframes.

17. The base station of claim 13, wherein the at least one RRC message comprises a second parameter indicating a maximum duration for the burst.

* * * * *